April 15, 1952  G. P. GRANT, JR  2,592,524
DIRECT POSITIVE CAMERA ADAPTER
Filed June 28, 1949  2 SHEETS—SHEET 1
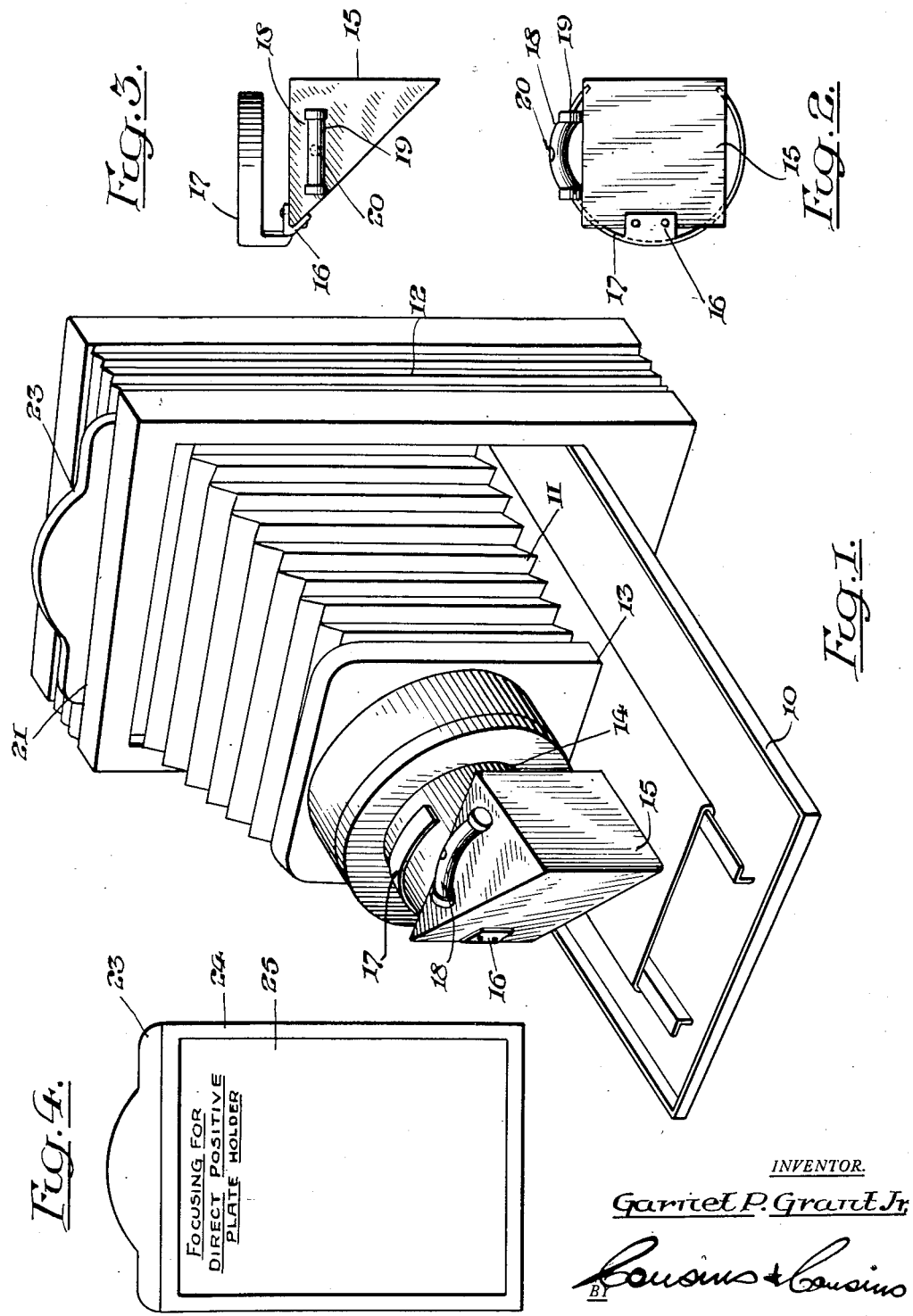
INVENTOR.
Garriet P. Grant Jr.
BY Cousins & Cousins
ATTORNEYS.

April 15, 1952     G. P. GRANT, JR     2,592,524
DIRECT POSITIVE CAMERA ADAPTER
Filed June 28, 1949     2 SHEETS—SHEET 2
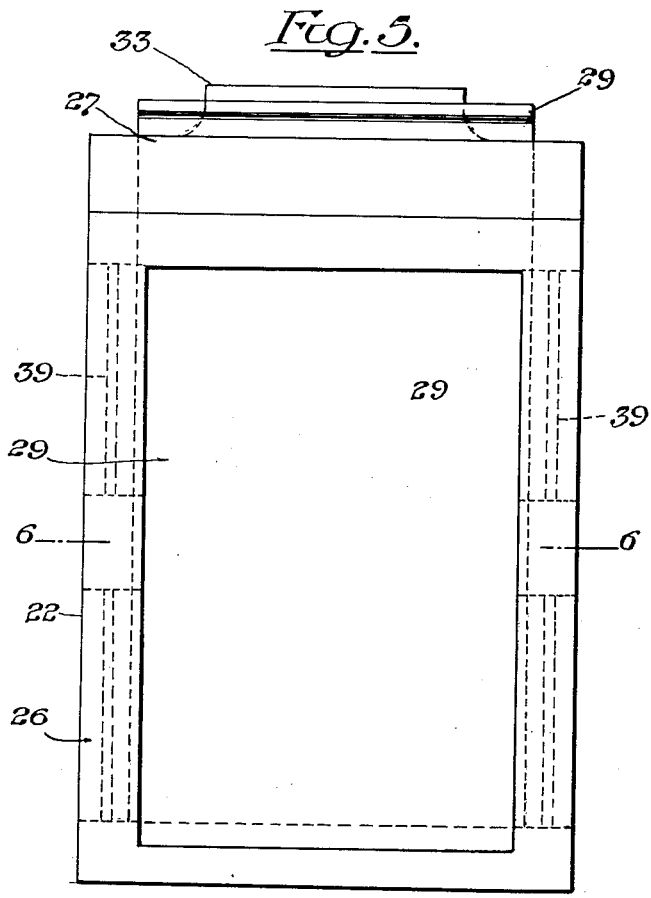
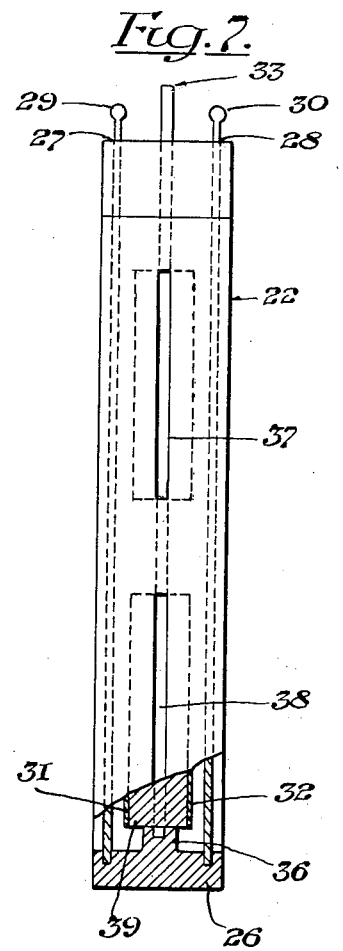
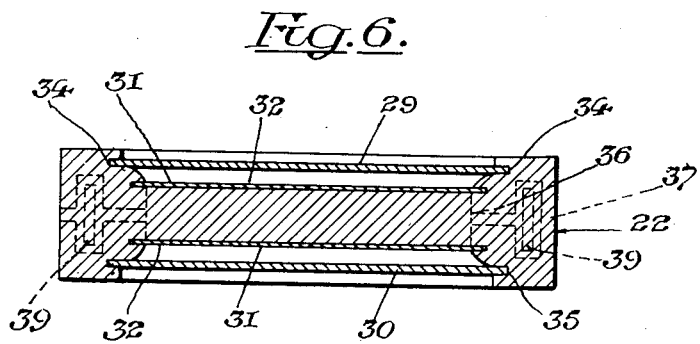
INVENTOR.
Garnet P. Grant Jr.
BY Cousins & Cousins
ATTORNEYS.

Patented Apr. 15, 1952

2,592,524

UNITED STATES PATENT OFFICE 2,592,524

DIRECT POSITIVE CAMERA ADAPTER

Garnet P. Grant, Jr., Old Greenwich, Conn., assignor to Grant Photo Products, Inc., New York, N. Y., a corporation of Delaware Application June 28, 1949, Serial No. 101,748

2 Claims. (Cl. 95—11)

1

This invention relates to apparatus for adapting photographic cameras for direct positive film.

Where direct positive film is used in a photographic camera, it is necessary to provide some means for reversing the picture laterally so that a true image can be produced.

Once the exposure has been made, the film must be exposed to suitable chemicals in order to develop and fix it.

An object of this invention is to provide means whereby photographers may take, develop and present customers with a positive print, without leaving the studio and without using a dark room.

Another object of this invention is to provide means for adapting the ordinary photographic camera for direct positive film.

A feature of this invention is its film holder which may be employed as a developing tank for daylight developing.

Another feature of this invention is its novel image reversing means which provides accurate photographs.

A further feature of this invention is the provision of means to compensate for the use of the special plate holder while focusing.

The invention consists of the construction, combination and arrangement of parts, as herein illustrated, described and claimed.

In the accompanying drawings, forming a part hereof, is illustrated one form of embodiment of the invention, in which drawings similar reference characters designate corresponding parts, and in which:

Figure 1 is a view in perspective of a photographic camera showing the image reversing means thereon, according to this invention.

Figure 2 is a front view in elevation of the said image reversing means.

Figure 3 is a top plan view of the image reversing means shown in Figures 1 and 2.

Figure 4 is a focusing spacer plate used in the taking of pictures, according to this invention.

Figure 5 is a view in front elevation, showing a novel film holder, according to this invention.

Figure 6 is a sectional view, taken on line 6—6 of Figure 5.

Figure 7 is a view in side elevation of the film holder shown in Figure 5, with certain portions cut away to show the construction thereof.

Referring to the drawings, and particularly to Figure 1, the reference numeral 10 indicates a camera having the customary bellows 11, plate receiving back 12, and lens board 13. The lens 14, carried by the board 13, has secured thereto

2 an image reversing device such as a surface mirror or a prism 15.

The prism 15, best shown in Figures 2 and 3, is secured as at 16 to a suitable clip 17. The clip 17 is adapted to snap over the lens 14 so as to secure the prism 15 to the front thereof.

Secured to the top of the prism 15 is a curved glass tube 18 having a suitable liquid therein 19, and a bubble of air 20, provided within said tube 18 so as to operate as a level indicator. In this manner the prism 15 may be oriented in a horizontal position so as to insure its correct location upon the front of the camera 10.

The back 12 of the camera 10 is provided with the well known ground glass focusing screen (not shown), and also an aperture 21 to receive therein the film holder 22. Inasmuch as the film carried by the holder 22, constructed in accordance with this invention, is rearwardly disposed of the film normally carried by the film holder, it is necessary to provide a focusing spacer 23 used in conjunction with the camera. The spacer 23, best shown in Figure 4, comprises a frame 24 having a transparent plate 25 carried therein.

The thickness of the focusing spacer 23 is such that when inserted in the back 12 of the camera 10, it will move the ground glass screen rearwardly of the lens, the desired distance. In order to remind the photographer that the spacer 23 is in the camera and that he must use a film holder in accordance with this invention, the words "Focusing for direct positive plate holder," or other suitable legend is impressed upon the transparent plate 25.

The film holder in accordance with this invention is best shown in Figures 5, 6 and 7. While a two-exposure film holder has been shown, it is within the purview of this invention to use only a single sheet of film in said holder. The film holder shown in Figures 5, 6, and 7 consists of a frame 26 having openings 27—28 in the top thereof, to receive slides 29 and 30. The slides 29 and 30 may be withdrawn at a suitable time in order to expose the films 31 and 32 respectively located behind the said slides 29—30, within the film holder 22. The film holder 22 is also provided with a handle 33 to facilitate its insertion or removal from the camera 10.

Referring to Figure 6, it will be seen that the film holder 22 is provided with pairs of grooves 34 and 35, to receive the sides of the slides 29—30 as they are inserted within the film holder 22. A centrally disposed panel 36 is provided in the film holder 22 and operates as a support for the films 31 and 32. The construction of the film holder is such that the film may be laid upon the panel 36 within a dark room and the slides 29—30 slipped in front thereof, so as to keep them from being exposed until the said slides are removed at the time of taking the picture.

The openings 37—38 are provided in the sides of the film holder 22 and are suitably masked by baffles 39 so as to maintain the lightproof character of the film holder 22. It will be seen, however, that the developing liquid will be able to enter the film holder 22 through the openings 37—38, to develop the exposed film in the event that said film holder were immersed within said developing liquids. Moreover, it will be seen that this immersion can be accomplished in daylight without removing the slides 29—30, thereby enabling the film contained within the film holder to be developed.

In taking a picture in accordance with this invention, the photographer clips the prism or front surface mirror to his camera lens 14 and then levels it by means of the bubble 20 on the tube 18. He faces the camera at right angles to his subject so that the image is received within the prism 15 and focuses his camera. Before focusing, however, he must insert the focusing spacer 23 so that the ground glass screen will be rearwardly moved from its customary position.

The previously loaded film holder is then slipped into the back of the camera, occupying the space formerly filled by the focusing spacer plate. The forward slide 29 or 30 is then withdrawn and the exposure made by tripping the shutter in the customary manner. The slide may then be replaced and the plate holder reversed within the camera so as to take another exposure. When the film has been exposed the film holder 22 may be removed from the camera and successively immersed within suitable developing solutions (not shown) without leaving the studio or employing a dark room. The developing solutions will find their way to the film through the openings 37—38 in the above described manner. When the developing operation is completed, the film may be removed from the film holder 22 and exhibited or inspected to determine its desirability as a finished picture.

By means of the apparatus and method herein described, it will be possible for a photographer to present a person sitting for a portrait with a finished positive picture for immediate approval. Moreover, the necessity of submitting proofs and waiting for the dark room developing process will be eliminated.

Inasmuch as the length of time necessary to present pictures for the customer's approval is materially shortened, the photographer will not have to take as many pictures before satisfying his customer.

A further advantage of the above described invention is that it is adaptable to the presently used photographic equipment, so that the photographer may use his camera in the ordinary way or in accordance with the present invention, as he may require.

Having thus fully described the invention, what is claimed as new and desired to be secured by Letters Patent of the United States, is:

1. In combination with a photographic camera having a lens and ground glass focusing screen, apparatus for adapting said camera for taking direct positive pictures comprising, an image reversing prism adapted to be secured to the lens of said camera, a plate holder receivable within the camera, said plate holder comprising a film exposing slide and a frame having a suitable depth whereby a direct positive film may be supported therein at a distance from the said slide, said spaced arrangement of the film and slide being adapted to facilitate the passage therebetween of developing fluids, a transparent focusing spacer plate equal in thickness to the distance between the slide and photographic film, said spacer plate rearwardly displacing the ground glass focusing screen of the camera, during the focusing operation, a distance equal to the space between the slide and the position of the film when the said plate is removed and the film in the film holder substituted therefor so as to compensate for the necessary increased distance between the slide and the direct positive film in the developing film holder.

2. In combination with a photographic camera having a lens and ground glass focusing screen, apparatus for adapting said camera for taking direct positive pictures comprising, an image reversing prism adapted to be secured to the lens of said camera, a plate holder receivable within the camera, said plate holder comprising a film exposing slide at the front and back thereof, and a frame having a suitable depth, a panel centrally disposed within the frame forming a support and dividing the film holder into two chambers whereby direct positive films may be supported therein at a distance from the said slides, said spaced arrangement of the films and slides being adapted to facilitate the passage therebetween of developing fluids, a transparent focusing spacer plate equal in thickness to the distance between the slides and photographic films, said spacer plate rearwardly displacing the ground glass focusing screen of the camera, during the focusing operation, a distance equal to the space between the slides and the position of the films when the said plate is removed and the film in the film holder substituted therefor so as to compensate for the necessary increased distance between the slide and each of the direct positive films in the developing film holder.

GARNET P. GRANT, Jr.

REFERENCES CITED

The following references are of record in the file of this patent:

UNITED STATES PATENTS

| Number | Name | Date |
| --- | --- | --- |
| 52,239 | Wright | Jan. 23, 1866 |
| 308,946 | Benster | Dec. 9, 1884 |
| 999,238 | Landon | Aug. 1, 1911 |
| 1,208,071 | Wynkoop | Dec. 12, 1916 |
| 1,658,057 | Powers | Feb. 7, 1928 |
| 1,896,428 | Sohn | Feb. 7, 1933 |